US009242530B2

(12) United States Patent
Goenka

(10) Patent No.: US 9,242,530 B2
(45) Date of Patent: Jan. 26, 2016

(54) HEAT EXCHANGER WITH PHASE CHANGE MATERIAL MANIFOLDS

(75) Inventor: Lakhi Nandlal Goenka, Ann Arbor, MI (US)

(73) Assignee: Hanon Systems, Daejeon-si (KR)

( * ) Notice: Subject to any disclaimer, the term of this patent is extended or adjusted under 35 U.S.C. 154(b) by 576 days.

(21) Appl. No.: 13/283,679

(22) Filed: Oct. 28, 2011

(65) Prior Publication Data

US 2013/0105126 A1    May 2, 2013

(51) Int. Cl.
| | |
|---|---|
| F25B 39/02 | (2006.01) |
| B60H 1/00 | (2006.01) |
| F28D 7/16 | (2006.01) |
| F28D 21/00 | (2006.01) |
| F28D 20/00 | (2006.01) |
| F28D 20/02 | (2006.01) |
| B60H 1/32 | (2006.01) |
| F28D 1/053 | (2006.01) |
| F28F 9/02 | (2006.01) |

(52) U.S. Cl.
CPC *B60H 1/005* (2013.01); *F28D 7/16* (2013.01); *F28D 20/021* (2013.01); *B60H 1/323* (2013.01); *F28D 1/05391* (2013.01); *F28D 20/0034* (2013.01); *F28D 20/02* (2013.01); *F28D 2020/0008* (2013.01); *F28D 2020/0013* (2013.01); *F28D 2020/0078* (2013.01); *F28D 2021/0085* (2013.01); *F28F 9/02* (2013.01); *Y02E 60/145* (2013.01); *Y02E 60/147* (2013.01)

(58) Field of Classification Search
CPC .................. Y02E 60/147; F28D 20/02; F28D 2021/0085; F28D 1/05391; F28D 2020/0013; F28D 2020/0008; F28D 20/021; F28D 20/0034; B60H 1/005; B60H 1/323; F28F 9/02

USPC ......... 165/10, 140, 156, 104.17; 62/515, 518, 62/524, 525

See application file for complete search history.

(56) References Cited

U.S. PATENT DOCUMENTS

| | | | |
|---|---|---|---|
| 4,595,297 A * | 6/1986 | Liu et al. ................... | 374/29 |
| 4,966,228 A | 10/1990 | Fawcett | |
| 5,269,372 A * | 12/1993 | Chu et al. ................... | 165/80.4 |
| 6,854,513 B2 * | 2/2005 | Shirota et al. ............. | 165/203 |
| 7,406,998 B2 | 8/2008 | Kudo | |
| 7,721,757 B2 | 5/2010 | Ginies et al. | |
| 8,191,618 B2 * | 6/2012 | Gering et al. ............. | 165/202 |
| 2006/0124287 A1 * | 6/2006 | Reinders .................. | 165/166 |
| 2008/0127661 A1 * | 6/2008 | Bhatti et al. .............. | 62/171 |
| 2009/0007584 A1 * | 1/2009 | Reinders .................. | 62/310 |
| 2009/0095015 A1 * | 4/2009 | Kerler et al. ............... | 62/524 |
| 2009/0211732 A1 * | 8/2009 | Goenka .................... | 165/104.17 |
| 2009/0236071 A1 * | 9/2009 | Jensen ..................... | 165/10 |
| 2009/0250189 A1 | 10/2009 | Soukhojak et al. | |
| 2010/0065244 A1 * | 3/2010 | Yokoyama et al. ........ | 165/10 |
| 2010/0157525 A1 * | 6/2010 | Ullman et al. ............. | 361/688 |
| 2010/0175849 A1 | 7/2010 | Bellenfant et al. | |
| 2010/0223949 A1 * | 9/2010 | Higashiyama et al. .... | 62/519 |
| 2010/0300140 A1 | 12/2010 | Leitzel et al. | |
| 2010/0313587 A1 * | 12/2010 | Wolfe et al. .............. | 62/244 |
| 2011/0154855 A1 * | 6/2011 | Sasaki et al. ............. | 62/524 |
| 2011/0239696 A1 * | 10/2011 | Takagi .................... | 62/524 |

\* cited by examiner

*Primary Examiner* — Marc Norman
*Assistant Examiner* — Max Snow
(74) *Attorney, Agent, or Firm* — Fraser Clemens Martin & Miller LLC; James D. Miller

(57) ABSTRACT

This invention is directed to a heat exchanger that exchanges heat between a first fluid, a second fluid, and a phase change material (PCM). Both tubes and header tanks contain phase change material. The phase change material header tanks are advantageously located outside of the first fluid's header tanks.

16 Claims, 2 Drawing Sheets

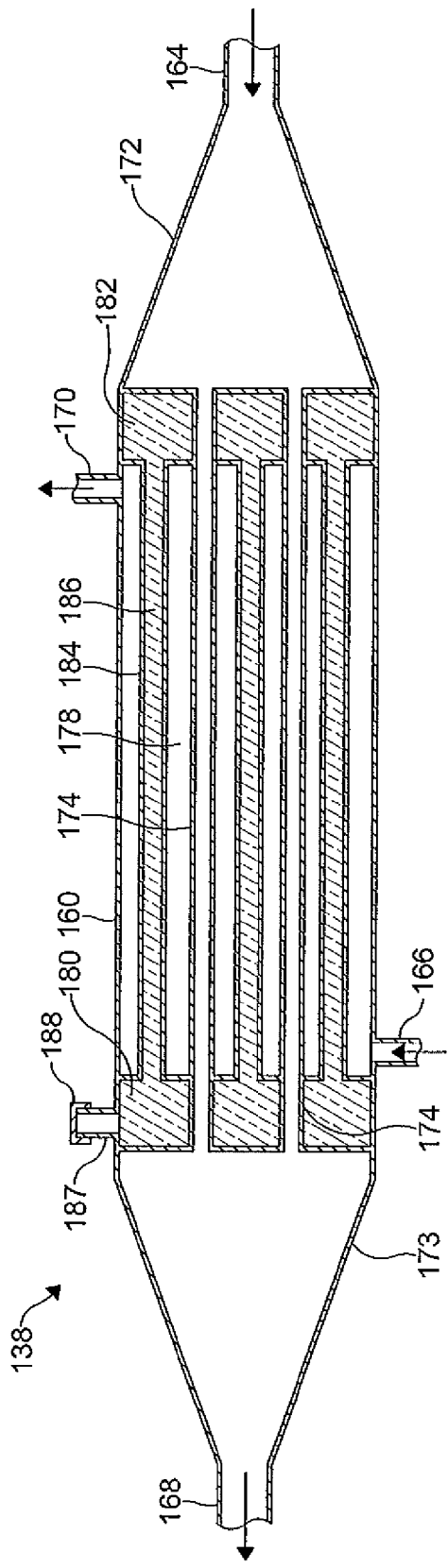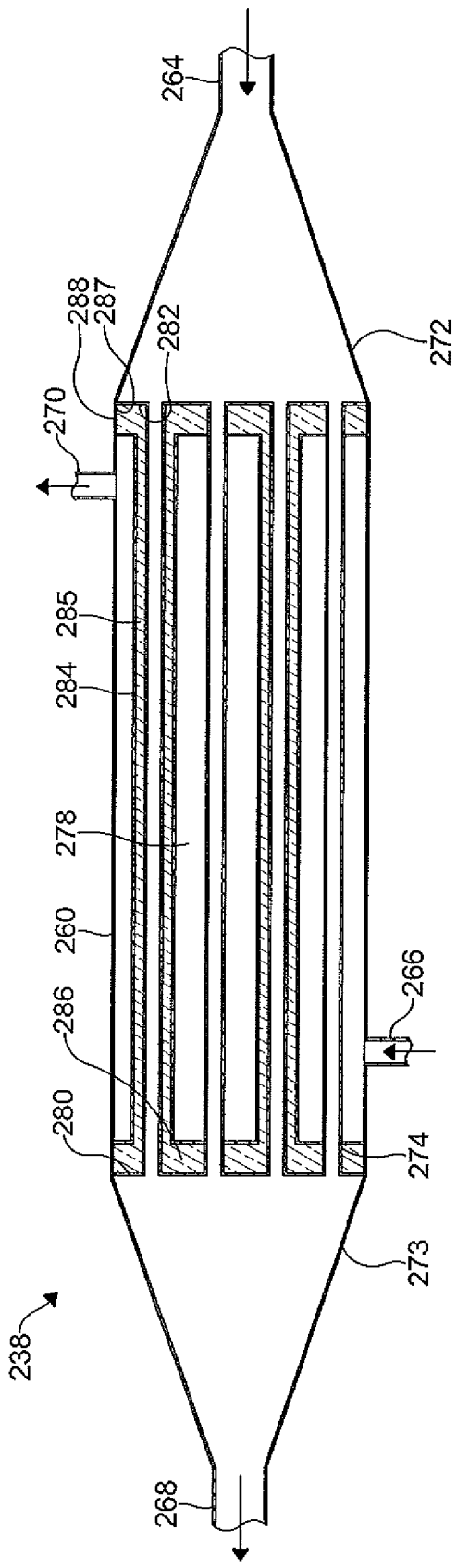

HEAT EXCHANGER WITH PHASE CHANGE MATERIAL MANIFOLDS

FIELD OF THE INVENTION

The invention relates to a climate control system for a vehicle and more particularly to a thermal energy exchanger for a heating, ventilating, and air conditioning system.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilating and air conditioning (HVAC) system. The HVAC system conditions air flowing therethrough and distributes the conditioned air throughout the passenger compartment.

Typically, a compressor of a refrigeration system provides a flow of a fluid having a desired temperature to an evaporator disposed in the HVAC system to condition the air. The compressor is generally driven by a fuel-powered engine of the vehicle. However, in recent years, vehicles having improved fuel economy over the fuel-powered engine and other vehicles are quickly becoming more popular as a cost of traditional fuel increases. The improved fuel economy is due to known technologies such as regenerative braking, electric motor assist, and engine-off operation. Although the technologies improve fuel economy, accessories powered by the fuel-powered engine no longer operate when the fuel-powered engine is not in operation. One major accessory that does not operate is the compressor of the refrigeration system. Therefore, without the use of the compressor, the evaporator disposed in the HVAC system does not condition the air flowing therethrough and the temperature of the passenger compartment increases to a point above a desired temperature.

Accordingly, vehicle manufacturers have used a thermal energy exchanger disposed in the HVAC system to condition the air flowing therethrough when the fuel-powered engine is not in operation. One such thermal energy exchanger, also referred to as a cold accumulator, is described in U.S. Pat. No. 6,854,513 entitled VEHICLE AIR CONDITIONING SYSTEM WITH COLD ACCUMULATOR, hereby incorporated herein by reference in its entirety. The cold accumulator includes a phase change material, also referred to as a cold accumulating material, disposed therein. The cold accumulating material absorbs heat from the air when the fuel-powered engine is not in operation. The cold accumulating material is then recharged by the conditioned air flowing from the cooling heat exchanger when the fuel-powered engine is in operation.

In U.S. Pat. No. 6,691,527 entitled AIR-CONDITIONER FOR A MOTOR VEHICLE, hereby incorporated herein by reference in its entirety, a thermal energy exchanger is disclosed having a phase change material disposed therein. The phase change material of the thermal energy exchanger conditions a flow of air through the HVAC system when the fuel-powered engine of the vehicle is not in operation. The phase change material is charged by a flow of a fluid from the refrigeration system therethrough.

While the prior art HVAC systems perform adequately, it is desirable to produce a thermal energy exchanger having a phase change material disposed therein for an HVAC system, wherein an effectiveness and efficiency thereof are maximized.

SUMMARY OF THE INVENTION

In concordance and agreement with the present invention, a thermal energy exchanger having a phase change material disposed therein for an HVAC system, wherein an effectiveness and efficiency thereof are maximized, has surprisingly been discovered.

In one embodiment, the thermal energy exchanger for a heating, ventilating, and air conditioning system comprises a main housing having a hollow interior; a plurality of first tubes disposed in the housing forming open areas therebetween, wherein at least one of the first tubes receives a first fluid therein; and a plurality of second tubes disposed in the housing, the second tubes interleaved with the first tubes, wherein at least a portion of at least one of the second tubes includes a phase change material disposed therein.

In another embodiment, the thermal energy exchanger for a heating, ventilating, and air conditioning system comprises a hollow main housing including a first inlet and a first outlet, wherein the first inlet and the first outlet are in fluid communication with a source of cooled fluid, the housing further including a second inlet and a second outlet, wherein the second inlet and the second outlet are in fluid communication with a heat exchanger disposed in a control module of a heating, ventilating, and air conditioning system; a plurality of first tubes disposed in the housing forming open areas therebetween, wherein at least one of the first tubes receives a first fluid from the source of cooled fluid therein and the open areas receive a second fluid from the heat exchanger therein; and a plurality of second tubes disposed in the housing, wherein at least one of the second tubes includes a phase change material disposed therein.

In another embodiment, the thermal energy exchanger for a heating, ventilating, and air conditioning system comprises a hollow main housing including a first inlet and a first outlet, wherein the first inlet and the first outlet are in fluid communication with a source of cooled fluid, the housing further including a second inlet and a second outlet, wherein the second inlet and the second outlet are in fluid communication with a heat exchanger disposed in a control module of the heating, ventilating, and air conditioning system; a plurality of first tubes disposed in the housing fluidly connecting the first inlet and the first outlet, wherein the first tubes form open areas therebetween, the open areas fluidly connecting the second inlet and the second outlet, wherein at least one of the first tubes receives a first fluid from the source of cooled fluid therein and the open areas receive a second fluid from the heat exchanger therein; and a plurality of second tubes disposed in the housing, wherein at least one of the second tubes surrounds alternating first tubes forming a space therebetween, wherein the space includes a phase change material disposed therein.

BRIEF DESCRIPTION OF THE DRAWINGS

The above, as well as other objects and advantages of the invention, will become readily apparent to those skilled in the art from reading the following detailed description of various embodiments of the invention when considered in the light of the accompanying drawings in which:

FIG. 2 is a fragmentary schematic cross-sectional elevational view of a thermal energy exchanger having a phase change material disposed therein according to another embodiment of the invention; and FIG. 3 is a fragmentary schematic cross-sectional elevational view of a thermal energy exchanger having a phase change material disposed therein according to another embodiment of the invention.

DETAILED DESCRIPTION OF THE PREFERRED EMBODIMENT

Figure 1:
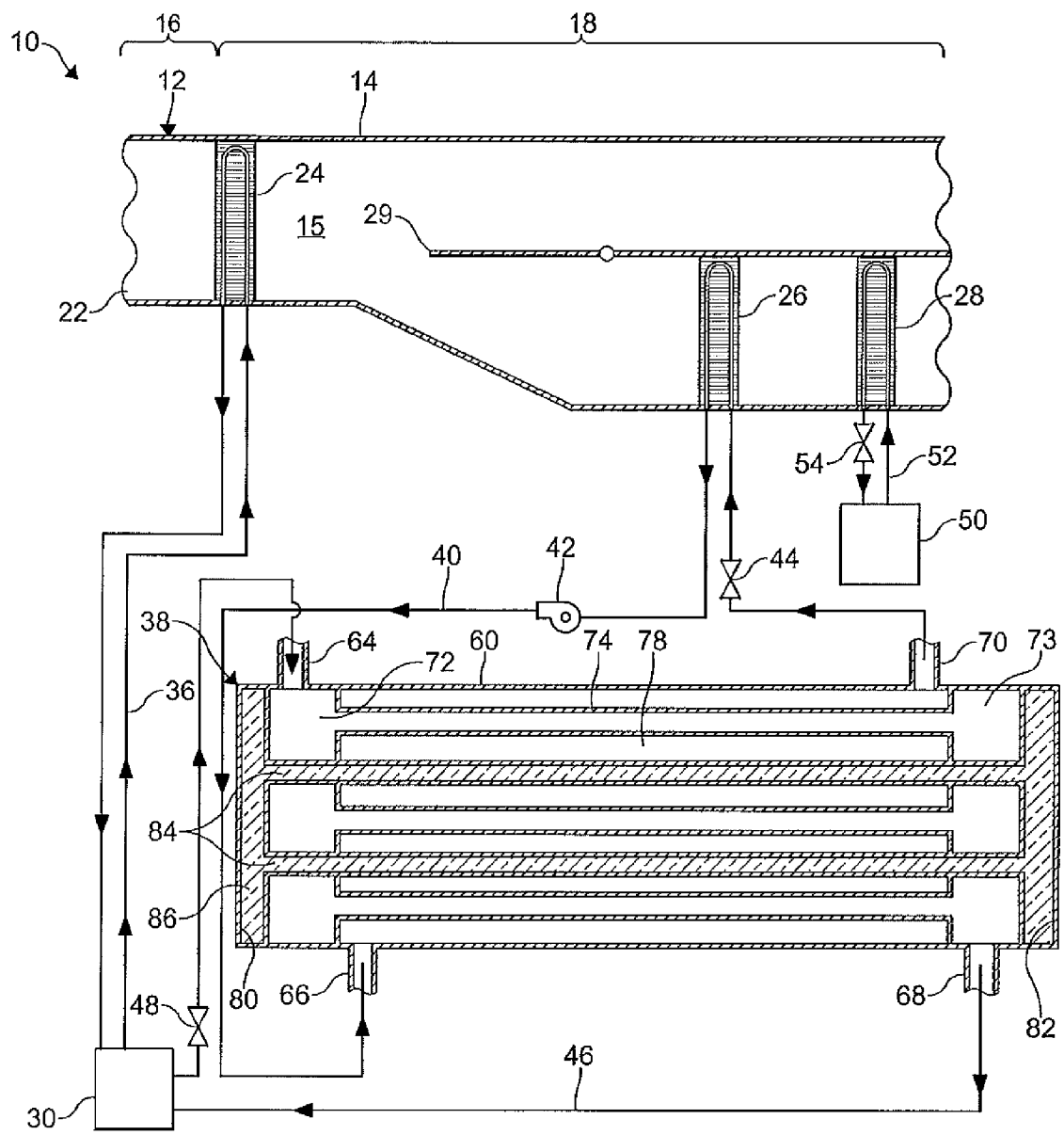
FIG. 1 is a fragmentary schematic flow diagram of an HVAC system including a schematic cross-sectional view of a thermal energy exchanger having a phase change material disposed therein according to an embodiment of the invention.

The following detailed description and appended drawings describe and illustrate various exemplary embodiments of the invention. The description and drawings serve to enable one skilled in the art to make and use the invention, and are not intended to limit the scope of the invention in any manner.

FIG. 1 shows a heating, ventilating, and air conditioning (HVAC) system 10 according to an embodiment of the invention. The HVAC system 10 typically provides heating, ventilation, and air conditioning for a passenger compartment of a vehicle (not shown). The HVAC system 10 includes a control module 12 to control at least a temperature of the passenger compartment. The module 12 illustrated includes a hollow main housing 14 with an air flow conduit 15 formed therein. The housing 14 includes an inlet section 16, a mixing and conditioning section 18, and an outlet and distribution section (not shown). In the embodiment shown, an air inlet 22 is formed in the inlet section 16. The air inlet 22 is in fluid communication with a supply of air (not shown). The supply of air can be provided from outside of the vehicle, recirculated from the passenger compartment of the vehicle, or a mixture of the two, for example. The inlet section 16 is adapted to receive a blower wheel (not shown) therein to cause air to flow through the air inlet 22. A filter (not shown) can be provided upstream or downstream of the inlet section 16 if desired.

The mixing and conditioning section 18 of the housing 14 is adapted to receive an evaporator core 24, and at least one of a heat exchanger 26 and a heater core 28 therein. In the embodiment shown, the heat exchanger 26 and the heater core 28 are disposed downstream of a blend door 29. The blend door 29 is adapted to selectively permit a flow of air through the heat exchanger 26 and the heater core 28 when the HVAC system 10 is not operating in a pull-down mode. A filter (not shown) can also be provided upstream of the evaporator core 24, if desired.

The evaporator core 24 is in fluid communication with a source of cooled fluid 30 such as a refrigeration system, for example, through a conduit 36. The evaporator core 24 is adapted to absorb thermal energy and cool the air flowing therethrough when a fuel-powered engine of the vehicle is in operation.

The heat exchanger 26 is in fluid communication with a thermal energy exchanger 38 through a conduit 40. The conduit 40 includes a pump 42 and a valve 44 disposed therein. The pump 42 is adapted to cause a fluid (not shown) disposed therein to circulate through the conduit 40. The valve 44 selectively militates against a flow of the fluid therethrough. It is understood that the fluid can be any conventional fluid such as an engine coolant, for example. The fluid is adapted to absorb thermal energy and cool the air flowing through the heat exchanger 26 when the fuel-powered engine of the vehicle is not in operation.

The thermal energy exchanger 38 is also in fluid communication with the source of cooled fluid 30 through a conduit 46. The conduit 46 can include a valve 48 disposed therein to selectively militate against a flow of the cooled fluid therethrough.

The heater core 28 is in fluid communication with a source of heated fluid 50 through a conduit 52. The source of heated fluid 50 can be any conventional source of heated fluid such as the fuel-powered engine of the vehicle, for example, and the heated fluid can be any conventional fluid such as an engine coolant, for example. A valve 54 may be disposed in the conduit 52 to selectively militate against a flow of the heated fluid therethrough. The heater core 28 is adapted to release thermal energy and heat the air flowing therethrough when the fuel-powered engine of the vehicle is in operation. It is understood that the source of heated fluid 50 can be in fluid communication with the heat exchanger 26 as desired without departing from the scope and spirit of the invention.

In the embodiment shown, the thermal energy exchanger 38 has a cross-flow configuration and includes a main housing 60 having a hollow interior. The main housing 60 may be made of conventional materials such as polypropylene, for example. In the embodiment shown, the main housing 60 is generally rectangular in shape. It is understood that the main housing 60 can have other shapes as desired such as cylindrical, for example. The main housing 60 includes a first inlet 64, a second inlet 66, a first outlet 68, and a second outlet 70 formed therein. The inlets 64, 66 and the outlets 68, 70 are formed to extend laterally outwardly from the main housing 60. The first inlet 64 and the first outlet 68 are in fluid communication with the source of cooled fluid 30 through the conduit 46. The second inlet 66 and the second outlet 70 are in fluid communication with the heat exchanger 26 through the conduit 40. An insulating material (not shown) can be disposed on an outer surface of the main housing 60 to militate against a dissipation of thermal energy therefrom.

The first inlet 64 and the first outlet 68 are fluidly connected by an inlet first manifold 72, an outlet second manifold 73, and a plurality of first tubes 74 extending therebetween. The manifolds 72, 73 and the first tubes 74 are disposed in the hollow interior of the thermal energy exchanger 38 and receive the fluid from the source of cooled fluid 30 therethrough. The manifolds 72, 73 are formed on opposite sides of the housing 60 substantially parallel to a flow of the fluid from the source of the cooled fluid 30 into the first inlet 64 and from the first outlet 68.

The first tubes 74 are substantially parallel in relation to each other and are spaced apart to define a series of open areas 78 therebetween. The flow of the fluid through the first tubes 74 is substantially perpendicular to the flow of the fluid from the source of the cooled fluid 30 through the first inlet 64, the first outlet 68, and the manifolds 72, 73. The first tubes 74 may include a plurality of spaced apart fins (not shown) extending radially outwardly therefrom and/or a plurality of space apart fins (not shown) extending radially inwardly therein to enhance a transfer of thermal energy between the fluid from the source of cooled fluid 30 and the fluid from the heat exchanger 26. The first tubes 74 and the fins are produced from a thermally conductive material such as copper, for example. The second inlet 66 and the second outlet 70 are fluidly connected by the open areas 78 defined by the first tubes 74. The open areas 78 receive the fluid from the heat exchanger 26 therethrough. The flow of the fluid through the open areas 78 is substantially parallel to the flow of the fluid from the heat exchanger 26 through the second inlet 66 and the second outlet 70 and substantially perpendicular to the flow of fluid from the source of cooled fluid 30 through the first tubes 74.

As illustrated in FIG. 1, the thermal energy exchanger 38 further includes a third manifold 80, a fourth manifold 82, and a plurality of second tubes 84 extending between the manifolds 80, 82 and through the manifolds 72, 73. Each of the manifolds 80, 82 and the second tubes 84 includes a phase change material 86 disposed therein. The phase change material 86 can be any material that melts and solidifies at predetermined temperatures such as a paraffin wax, an alcohol, water, and any combination thereof, for example, and is capable of storing and releasing thermal energy. In the embodiment shown, the phase change material 86 is adapted to absorb thermal energy of the fluid flowing through the open areas 78 when the fuel-powered engine is not in operation, and release thermal energy to the fluid from the source of cooled fluid 30 flowing through the first tubes 74 when the fuel-powered engine is in operation.

As shown, the manifolds 80, 82 are formed on opposite sides of the housing 60 adjacent an outer surface of the manifolds 72, 73, respectively, to enhance a transfer of thermal energy among the fluid from the source of cooled fluid 30, the fluid from the heat exchanger 26, and the phase change material 86. At least one of the manifolds 80, 82 can include an opening (not shown) formed therein to facilitate a filling of the manifolds 80, 82 and the second tubes 84. In certain embodiments, the phase change material 86 is heated above a melting point thereof to liquefy the phase change material 86. The liquid phase change material 86 is then poured into the opening, filling the manifolds 80, 82 and the second tubes 84. A cover (not shown) can be disposed over the opening to militate against a leakage of the phase change material 86 therefrom.

The second tubes 84 are substantially parallel in relation to each other and disposed in the open areas 78 defined by the first tubes 74. As shown, the second tubes 84 are interleaved with the first tubes 74 to further enhance the transfer of thermal energy between the fluids and the phase change material 86, if desired. It is understood that the second tubes 84 may include a plurality of spaced apart fins (not shown) extending radially outwardly therefrom and/or a plurality of space apart fins (not shown) extending radially inwardly therein to enhance a transfer of thermal energy among the fluid from the source of cooled fluid 30, the fluid from the heat exchanger 26, and the phase change material 86.

In use, when the fuel-powered engine of the vehicle is in operation, the fluid from the source of cooled fluid 30 circulates through the conduits 36, 46. Accordingly, the fluid from the source of cooled fluid 30 circulates through the evaporator core 24 and the thermal energy exchanger 38. The air from the inlet section 16 flows into the evaporator core 24 where the air is cooled to a desired temperature by a transfer of thermal energy from the air to the fluid from the source of cooled fluid 30. The conditioned air stream then exits the evaporator core 24. When the HVAC system 10 is not operating in the pull-down mode, the air from the evaporator core 24 is selectively permitted by the blend door 29 to flow through the heat exchanger 26 and the heater core 28, and into the outlet and distribution section. The fluid circulating through the conduit 46 flows into and through the first tubes 74 of the thermal energy exchanger 38. The fluid circulating through the conduit 46 absorbs thermal energy from the phase change material 86 disposed in the manifolds 80, 82 and the second tubes 84. The transfer of thermal energy cools and solidifies the phase change material 86. Additionally, the phase change material 86 cools the fluid circulating through conduit 40 and the heat exchanger 26 by absorbing thermal energy therefrom. The thermal energy absorbed by the phase change material 86 is then transferred to the fluid from the source of cooled fluid 30.

When the fuel-powered engine of the vehicle is not in operation, the fluid from the source of cooled fluid 30 does not circulate through the conduits 36, 46. Accordingly, the fluid does not circulate through the evaporator core 24 or the thermal energy exchanger 38. The pump 42 causes the fluid disposed in the heat exchanger 26 to circulate through the conduit 40 and the thermal energy exchanger 38. The fluid flows into and through the open areas 78 of the thermal energy exchanger 38, releasing thermal energy to the phase change material 86 disposed in the manifolds 80, 82 and the second tubes 84 thereof. Accordingly, the fluid is cooled by the phase change material 86. The air from the inlet section 16 flows into and through the evaporator core 24 where a temperature thereof is unchanged. The air then exits the evaporator core 24 and is selectively permitted to flow through the heat exchanger 26 and the heater core 28.

In the heat exchanger 26, the air is cooled to a desired temperature by a transfer of thermal energy from the air to the fluid circulating therethrough. The fluid absorbs and transfers the thermal energy from the air to the phase change material 86 disposed in the manifolds 80, 82 and the second tubes 84 of the thermal energy exchanger 38. Thus, the phase change material 86 is caused to melt. The conditioned cooled air then exits the heat exchanger 26 and flows through the heater core 28 and into the outlet and distribution section.

FIG. 2 shows a thermal energy exchanger 138 for use in the HVAC system 10 according to another embodiment of the invention. The thermal energy exchanger 138 has a cross-counter flow configuration and includes a main housing 160 having a hollow interior. The main housing 160 may be made of conventional materials such as polypropylene, for example. In the embodiment shown, the main housing 160 is generally rectangular in shape. It is understood that the main housing 160 can have other shapes as desired such as cylindrical, for example. The main housing 160 includes a first inlet 164, a second inlet 166, a first outlet 168, and a second outlet 170 formed thereon. The inlets 164, 166 and the outlets 168, 170 are formed to extend laterally outwardly from the main housing 160. The first inlet 164 and the first outlet 168 are in fluid communication with the source of cooled fluid 30, shown in FIG. 1. The second inlet 166 and the second outlet 170 are in fluid communication with the heat exchanger 26, shown in FIG. 1. An insulating material (not shown) can be disposed on an outer surface of the main housing 160 to militate against a dissipation of thermal energy therefrom.

The first inlet 164 and the first outlet 168 are fluidly connected by an inlet first manifold 172, an outlet second manifold 173, and a plurality of first tubes 174 extending therebetween. The manifolds 172, 173 and the first tubes 174 are disposed in the hollow interior of the thermal energy exchanger 138 and receive the fluid from the source of cooled fluid 30 therethrough. The manifolds 172, 173 are formed on opposite sides of the main housing 160 substantially parallel to a flow of the fluid from the source of the cooled fluid 30 into the first inlet 164 and from the first outlet 168. As shown, each of the manifolds 172, 173 perform as a diffuser so as to gradually decrease a rate of flow of the fluid from the source of cooled fluid 30 into the thermal energy exchanger 138 and gradually increase a rate of flow of the fluid from the source of cooled fluid 30 from the thermal energy exchanger 138. It is understood, however, that the manifolds 172, 173 can have any shape as desired.

The first tubes 174 are substantially parallel in relation to each other and are spaced apart to define a series of open areas 178 therebetween. The flow of the fluid through the first tubes 174 is substantially parallel to the flow of the fluid from the source of the cooled fluid 30 through the first inlet 164, the first outlet 168, and the manifolds 172, 173. The first tubes 174 may include a plurality of spaced apart fins (not shown) extending radially outwardly therefrom and/or a plurality of space apart fins (not shown) extending radially inwardly therein to enhance a transfer of thermal energy between the fluid from the source of cooled fluid 30 and the fluid from the heat exchanger 26. The first tubes 174 and the fins are produced from a thermally conductive material such as copper, for example. The second inlet 166 and the second outlet 170 are fluidly connected by the open areas 178 defined by the main housing 160 and the first tubes 174. The open areas 178 receive the fluid from the heat exchanger 26 therethrough. The flow of the fluid through the open areas 178 is substantially parallel to the flow of the fluid from the heat exchanger 26 through the second inlet 166 and the second outlet 170 and substantially perpendicular to the flow of fluid from the source of cooled fluid through the first tubes 174.

The thermal energy exchanger 138 further includes a third manifold 180, a fourth manifold 182, and a plurality of second tubes 184 extending between the manifolds 180, 182. Each of the manifolds 180, 182 and the second tubes 184 includes a phase change material 186 disposed therein. The phase change material 186 can be any material that melts and solidifies at predetermined temperatures such as a paraffin wax, an alcohol, water, and any combination thereof, for example, and is capable of storing and releasing thermal energy. In the embodiment shown, the phase change material 186 is adapted to absorb thermal energy of the fluid flowing through the open areas 178 when the fuel-powered engine is not in operation, and release thermal energy to the fluid from the source of cooled fluid 30 flowing through the first tubes 174 when the fuel-powered engine is in operation.

The manifold 180 shown includes an opening 187 formed therein to facilitate a filling of the manifolds 180, 182 and the second tubes 184. It is understood that the opening 187 can be formed in the manifold 182 if desired. In certain embodiments, the phase change material 186 is heated above a melting point thereof to liquefy the phase change material 186. The liquid phase change material 186 is then poured into the opening 187, filling the manifolds 180, 182 and the second tubes 184. A cover 188 is disposed over the opening 187 to militate against a leakage of the phase change material 186 therefrom.

As shown, the manifolds 180, 182 are formed on opposite sides of the main housing 160 adjacent an inner surface of the manifolds 172, 173, respectively, to enhance a transfer of thermal energy among the fluid from the source of cooled fluid 30, the fluid from the heat exchanger 26, and the phase change material 186. The second tubes 184 are substantially parallel in relation to each other and disposed in the open areas 178 defined by the first tubes 174. As shown, the second tubes 184 are interleaved with the first tubes 174 to further enhance the transfer of thermal energy between the fluids and the phase change material 186, if desired. It is understood that the second tubes 184 may include a plurality of spaced apart fins (not shown) extending radially outwardly therefrom and/or a plurality of space apart fins (not shown) extending radially inwardly therein to enhance a transfer of thermal energy among the fluid from the source of cooled fluid 30, the fluid from the heat exchanger 26, and the phase change material 186.

In use, when the fuel-powered engine of the vehicle is in operation, the fluid from the source of cooled fluid 30 circulates through the evaporator core 24 and the thermal energy exchanger 138. The air from the inlet section 16 flows into the evaporator core 24 where the air is cooled to a desired temperature by a transfer of thermal energy from the air to the fluid from the source of cooled fluid 30. The conditioned air stream then exits the evaporator core 24. When the HVAC system 10 is not operating in the pull-down mode, the air from the evaporator core 24 is selectively permitted by the blend door 29 to flow through the heat exchanger 26 and the heater core 28, and into the outlet and distribution section. The fluid circulating through the conduit 46 flows into and through the first tubes 174 of the thermal energy exchanger 138. The fluid circulating through the first tubes 174 absorbs thermal energy from the phase change material 186 disposed in the manifolds 180, 182 and the second tubes 184. The transfer of thermal energy cools and solidifies the phase change material 186. Additionally, the phase change material 186 cools the fluid circulating through the heat exchanger 26 by absorbing thermal energy therefrom. The thermal energy absorbed by the phase change material 186 is then transferred to the fluid from the source of cooled fluid 30.

When the fuel-powered engine of the vehicle is not in operation, the fluid from the source of cooled fluid 30 does not circulate through the evaporator core 24 or the thermal energy exchanger 138. The pump 42, shown in FIG. 1, causes the fluid disposed in the heat exchanger 26 to circulate through the thermal energy exchanger 138. The fluid flows into and through the open areas 178 of the thermal energy exchanger 138, releasing thermal energy to the phase change material 186 disposed in the manifolds 180, 182 and the second tubes 184 thereof. Accordingly, the fluid is cooled by the phase change material 186. The air from the inlet section 16 flows into and through the evaporator core 24 where a temperature thereof is unchanged. The air then exits the evaporator core 24 and is selectively permitted to flow through the heat exchanger 26 and the heater core 28.

In the heat exchanger 26, the air is cooled to a desired temperature by a transfer of thermal energy from the air to the fluid circulating therethrough. The fluid absorbs and transfers the thermal energy from the air to the phase change material 186 disposed in the manifolds 180, 182 and the second tubes 184 of the thermal energy exchanger 138. Thus, the phase change material 186 is caused to melt. The conditioned cooled air then exits the heat exchanger 26 and flows through the heater core 28 and into the outlet and distribution section.

FIG. 3 shows a thermal energy exchanger 238 for use in the HVAC system 10 according to another embodiment of the invention. The thermal energy exchanger 238 has a cross-counter flow configuration and includes a main housing 260 having a hollow interior. The main housing 260 may be made of conventional materials such as polypropylene, for example. In the embodiment shown, the main housing 260 is generally rectangular in shape. It is understood that the main housing 260 can have other shapes as desired such as cylindrical, for example. The main housing 260 includes a first inlet 264, a second inlet 266, a first outlet 268, and a second outlet 270 formed thereon. The inlets 264, 266 and the outlets 268, 270 are formed to extend laterally outwardly from the main housing 260. The first inlet 264 and the first outlet 268 are in fluid communication with the source of cooled fluid 30, shown in FIG. 1. The second inlet 266 and the second outlet 270 are in fluid communication with the heat exchanger 26, shown in FIG. 1. An insulating material (not shown) can be disposed on an outer surface of the main housing 260 to militate against a dissipation of thermal energy therefrom.

The first inlet 264 and the first outlet 268 are fluidly connected by an inlet first manifold 272, an outlet second manifold 273, and a plurality of first tubes 274 extending therebetween. The manifolds 272, 273 and the first tubes 274 are disposed in the hollow interior of the thermal energy exchanger 238 and receive the fluid from the source of cooled fluid 30 therethrough. The manifolds 272, 273 are formed on opposite sides of the housing 260 substantially parallel to a flow of the fluid from the source of the cooled fluid 30 into the first inlet 264 and from the first outlet 268. As shown, each of the manifolds 272, 273 perform as a diffuser so as to gradually decrease a rate of flow of the fluid from the source of cooled fluid 30 into the thermal energy exchanger 238 and gradually increase a rate of flow of the fluid from the source of cooled fluid 30 from the thermal energy exchanger 238. It is understood, however, that the manifolds 272, 273 can have any shape as desired.

The first tubes 274 are substantially parallel in relation to each other and are spaced apart to define a series of open areas 278 therebetween. The flow of the fluid through the first tubes 274 is substantially parallel to the flow of the fluid from the source of the cooled fluid 30 through the first inlet 264, the first outlet 268, and the manifolds 272, 273. The first tubes 274 may include a plurality of spaced apart fins (not shown) extending radially outwardly therefrom and/or a plurality of space apart fins (not shown) extending radially inwardly therein to enhance a transfer of thermal energy between the fluid from the source of cooled fluid 30 and the fluid from the heat exchanger 26. The first tubes 274 and the fins are produced from a thermally conductive material such as copper, for example. The second inlet 266 and the second outlet 270 are fluidly connected by the open areas 278 defined by the main housing 260 and the first tubes 274. The open areas 278 receive the fluid from the heat exchanger 26 therethrough. The flow of the fluid through the open areas 278 is substantially parallel to the flow of the fluid from the heat exchanger 26 through the second inlet 266 and the second outlet 270 and substantially perpendicular to the flow of fluid from the source of cooled fluid through the first tubes 274.

The thermal energy exchanger 238 further includes a third manifold 280, a fourth manifold 282, and a plurality of second tubes 284 extending between the manifolds 280, 282. Each of the second tubes 284 surrounds alternating first tubes 274, forming a substantially cylindrical space 285 therebetween. Each of the manifolds 280, 282 and the space 285 between the tubes 274, 284 includes a phase change material 286 disposed therein. The phase change material 286 can be any material that melts and solidifies at predetermined temperatures such as a paraffin wax, an alcohol, water, and any combination thereof, for example, and is capable of storing and releasing thermal energy. In the embodiment shown, the phase change material 286 is adapted to absorb thermal energy of the fluid flowing through the open areas 278 when the fuel-powered engine is not in operation, and release thermal energy to the fluid from the source of cooled fluid 30 flowing through the first tubes 274 when the fuel-powered engine is in operation.

The manifold 282 shown includes an opening 287 formed therein to facilitate a filling of the manifolds 280, 282 and the space 285 between the tubes 274, 284. It is understood that the opening 287 can be formed in the manifold 280 if desired. In certain embodiments, the phase change material 286 is heated above a melting point thereof to liquefy the phase change material 286. The liquid phase change material 286 is then poured into the opening 287, filling the manifolds 280, 282 and the space 285 between the tubes 274, 284. A cover 288 is disposed over the opening 287 to militate against a leakage of the phase change material 286 therefrom.

As shown, the manifolds 280, 282 are formed on opposite sides of the main housing 260 adjacent an inner surface of the manifolds 272, 273, respectively, to enhance a transfer of thermal energy among the fluid from the source of cooled fluid 30, the fluid from the heat exchanger 26, and the phase change material 286. The second tubes 284 are substantially parallel in relation to each other and disposed in the open areas 278 defined by the first tubes 274. As shown, the first tubes 274 surrounded by the second tubes 284 are interleaved with the remaining first tubes 274 to further enhance the transfer of thermal energy between the fluids and the phase change material 286, if desired. It is understood that the second tubes 284 may include a plurality of spaced apart fins (not shown) extending radially outwardly therefrom and/or a plurality of space apart fins (not shown) extending radially inwardly therein to enhance a transfer of thermal energy among the fluid from the source of cooled fluid 30, the fluid from the heat exchanger 26, and the phase change material 286.

In use, when the fuel-powered engine of the vehicle is in operation, the fluid from the source of cooled fluid 30 circulates through the evaporator core 24 and the thermal energy exchanger 238. The air from the inlet section 16 flows into the evaporator core 24 where the air is cooled to a desired temperature by a transfer of thermal energy from the air to the fluid from the source of cooled fluid 30. The conditioned air stream then exits the evaporator core 24. When the HVAC system 10 is not operating in the pull-down mode, the air from the evaporator core 24 is selectively permitted by the blend door 29 to flow through the heat exchanger 26 and the heater core 28, and into the outlet and distribution section. The fluid circulating through the conduit 46 flows into and through the first tubes 274 of the thermal energy exchanger 238. The fluid circulating through the first tubes 274 absorbs thermal energy from the phase change material 286 disposed in the manifolds 280, 282 and the space 285 formed between the tubes 274, 284. The transfer of thermal energy cools and solidifies the phase change material 286. Additionally, the phase change material 286 cools the fluid circulating through the heat exchanger 26 by absorbing thermal energy therefrom. The thermal energy absorbed by the phase change material 286 is then transferred to the fluid from the source of cooled fluid 30.

When the fuel-powered engine of the vehicle is not in operation, the fluid from the source of cooled fluid 30 does not circulate through the evaporator core 24 or the thermal energy exchanger 238. The pump 42, shown in FIG. 1, causes the fluid disposed in the heat exchanger 26 to circulate through the thermal energy exchanger 238. The fluid flows into and through the open areas 278 of the thermal energy exchanger 238, releasing thermal energy to the phase change material 286 disposed in the manifolds 280, 282 and the space 285 formed between the tubes 274, 284 thereof. Accordingly, the fluid is cooled by the phase change material 286. The air from the inlet section 16 flows into and through the evaporator core 24 where a temperature thereof is unchanged. The air then exits the evaporator core 24 and is selectively permitted to flow through the heat exchanger 26 and the heater core 28.

In the heat exchanger 26, the air is cooled to a desired temperature by a transfer of thermal energy from the air to the fluid circulating therethrough. The fluid absorbs and transfers the thermal energy from the air to the phase change material 286 disposed in the manifolds 280, 282 and the space 285 formed between the tubes 274, 284 of the thermal energy exchanger 238. Thus, the phase change material 286 is caused to melt. The conditioned cooled air then exits the heat exchanger 26 and flows through the heater core 28 and into the outlet and distribution section.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heating, ventilating, and air conditioning system comprising:
 a control module including a housing forming an air flow conduit and having an inlet section and a mixing section;
 an evaporator core, a heat exchanger, and a heater core, all of which are disposed within the air flow conduit;
 a blend door disposed between the evaporator core and the heat exchanger;
 a thermal energy exchanger comprising:
  a main housing having a hollow interior;
  a plurality of first tubes disposed in the housing forming open areas therebetween, wherein the first tubes receive a first fluid therein;
  a plurality of second tubes disposed in the housing, the second tubes interleaved with the first tubes, wherein the second tubes include a phase change material disposed therein;
  a first manifold and a second manifold in fluid communication with the first tubes; and
  a third manifold and a fourth manifold in fluid communication with the second tubes, wherein the third manifold and the fourth manifold are disposed outside of the first manifold and the second manifold with respect to a longitudinal direction of the second tubes;
  wherein the open areas receive a second fluid from the heat exchanger; and
 a source of cooled fluid in fluid communication with the evaporator core and the thermal energy exchanger, wherein the first tubes receive the first fluid from the source of cooled fluid, wherein the thermal energy exchanger is in fluid communication with the heat exchanger and heat exchange between the first fluid from the source of cooled fluid and the second fluid from the heat exchanger occurs in the thermal energy exchanger.

2. The heating, ventilating, and air conditioning system according to claim 1, wherein at least one of the first manifold or the second manifold is a diffuser.

3. The heating, ventilating, and air conditioning system according to claim 1, wherein the third manifold and the fourth manifold include the phase change material disposed therein.

4. The heating, ventilating, and air conditioning system according to claim 1, wherein the phase change material is cooled and solidified by the first fluid.

5. The heating, ventilating, and air conditioning system according to claim 1, wherein each of the second tubes surrounds alternating first tubes forming a space therebetween.

6. The heating, ventilating, and air conditioning system according to claim 5, wherein the phase change material is disposed in the space formed between the first tubes and the second tubes.

7. A heating, ventilating, and air conditioning system comprising:
 a control module including a housing forming an air flow conduit and having an inlet section and a mixing section;
 an evaporator core, a heat exchanger, and a heater core, all of which are disposed within the air flow conduit;
 a blend door disposed between the evaporator core and the heat exchanger;
 a source of cooled fluid in fluid communication with the evaporator core; and
 a thermal energy exchanger comprising:
  a hollow main housing including a first inlet and a first outlet, wherein the first inlet and the first outlet are in fluid communication with the source of cooled fluid, the housing further including a second inlet and a second outlet, wherein the second inlet and the second outlet are in fluid communication with the heat exchanger;
  a plurality of first tubes disposed in the housing forming open areas therebetween, wherein the first tubes receive a first fluid from the source of cooled fluid therein and the open areas receive a second fluid from the heat exchanger therein, and heat exchange between the first fluid and the second fluid occurs in the thermal energy exchanger;
  a plurality of second tubes disposed in the housing, wherein the second tubes includes a phase change material disposed therein;
  a first manifold in fluid communication with the first tubes and the first inlet and a second manifold in fluid communication with the first tubes and the first outlet, and
  a third manifold and a fourth manifold in fluid communication with the second tubes, wherein the third manifold and the fourth manifold are disposed outside of the first manifold and the second manifold with respect to a longitudinal direction of the second tubes;
  wherein the open areas are in fluid communication with the second inlet and the second outlet.

8. The heating, ventilating, and air conditioning system according to claim 7, wherein the first tubes are interleaved with the second tubes.

9. The heating, ventilating, and air conditioning system according to claim 7, wherein at least one of the first manifold or the second manifold is a diffuser.

10. The heating, ventilating, and air conditioning system according to claim 7, wherein the first inlet is formed in a first side of the main housing adjacent a first end of the main housing, the first outlet is formed in a second side of the main housing adjacent a second end of the main housing, the second inlet is formed in the second side of the main housing adjacent the first end, and the second outlet is formed in the first side of the main housing adjacent the second end, wherein the first end is arranged opposite the second end and the first side is arranged opposite the second side.

11. The heating, ventilating, and air conditioning system according to claim 1, wherein the first fluid enters the thermal energy exchanger at a first side of the main housing adjacent a first end thereof and exits the thermal energy exchanger at a second side of the main housing adjacent a second end thereof, wherein the first side is arranged opposite the second side and the first end is arranged opposite the second end.

12. The heating, ventilating, and air conditioning system according to claim 11, wherein the second fluid enters the thermal energy exchanger at the second side of the main housing adjacent the first end thereof and exits the thermal energy exchanger at the first side of the main housing adjacent the second end thereof.

13. The heating, ventilating, and air conditioning system according to claim 1, wherein each of the first fluid and the second fluid enter and exit the thermal energy exchanger in a direction perpendicular to a direction the first tubes extend between the first manifold and the second manifold and a direction the second tubes extend between the third manifold and the fourth manifold.

14. The heating, ventilating, and air conditioning system according to claim 1, wherein the second tubes extend through the first manifold and the second manifold.

15. The heating, ventilating, and air conditioning system according to claim 14, wherein the second tubes extend through the open areas formed between the first tubes.

16. The heating, ventilating, and air conditioning system according to claim 7, wherein each of the first inlet, the second inlet, the first outlet, and the second outlet extends outwardly from the main housing.

* * * * *